United States Patent
Apostle et al.

(10) Patent No.: US 11,473,602 B2
(45) Date of Patent: Oct. 18, 2022

(54) HAND CRANK CAM LOCK

(71) Applicant: Orbus, LLC, Woodridge, IL (US)

(72) Inventors: James J. Apostle, Shorewood, IL (US);
Drew A. Adams, Glenview, IL (US);
Dean Alkas, Oak Forest, IL (US); Ryan W. Duever, Sycamore, IL (US)

(73) Assignee: Orbus, LCC, Woodridge, IL (US)

( * ) Notice: Subject to any disclaimer, the term of this patent is extended or adjusted under 35 U.S.C. 154(b) by 190 days.

(21) Appl. No.: 16/801,810

(22) Filed: Feb. 26, 2020

(65) Prior Publication Data

US 2021/0262500 A1    Aug. 26, 2021

(51) Int. Cl.
*F16B 2/18*    (2006.01)
*F16H 25/12*    (2006.01)
*F16B 2/12*    (2006.01)

(52) U.S. Cl.
CPC ............. *F16B 2/18* (2013.01); *F16H 25/125* (2013.01); *F16B 2/12* (2013.01)

(58) Field of Classification Search
CPC .. F16B 7/046; F16B 2200/20; F16B 2200/40; F16B 7/04; F16B 2/18; F16B 2/12; F16B 7/1418; F16H 25/125
USPC ....... 403/252, 343, 264, 255, 254, 187, 230, 403/240, 257, 256, 248
See application file for complete search history.

(56) References Cited

U.S. PATENT DOCUMENTS

| | | | | |
|---|---|---|---|---|
| 4,345,849 A | * | 8/1982 | Stenemann | F16B 7/046 403/252 |
| 4,974,987 A | * | 12/1990 | Smock | E04B 2/744 403/252 |
| 5,315,805 A | * | 5/1994 | Harsch | E04B 2/744 403/170 |
| 6,148,569 A | * | 11/2000 | Giovannetti | F16B 7/046 403/231 |
| 6,338,591 B1 | * | 1/2002 | Lilienthal, II | H05K 9/0028 24/453 |

OTHER PUBLICATIONS

ATC Mechanical, "Square-Fit Steel Tubing" (2016). https://web.archive.org/web/20160314135521/https://www.atc-mechanical.com/mechanical-tubing/square-fit-steel-tubing/ (Year: 2016).*

* cited by examiner

*Primary Examiner* — Katina N. Henson
(74) *Attorney, Agent, or Firm* — Leydig, Voit & Mayer, Ltd.

(57) ABSTRACT

A hand crank cam lock for connecting medium to large sized display walls or boards including a hand crank disposed in a cam lock. The hand crank cam lock is configured to join two separate extrusions or frames together in a toolless manner. The hand crank cam lock locks these frames when the hand crank is turned clockwise, a plurality of hooks slide back along channels inside an outer body to grab the inner walls of a frame. This will in turn lock the hooks into place against the inner walls. The hand crank will only require half a turn to travel the required distance to lock the hooks into place and this half turn may be performed via a tool or by hand.

19 Claims, 19 Drawing Sheets

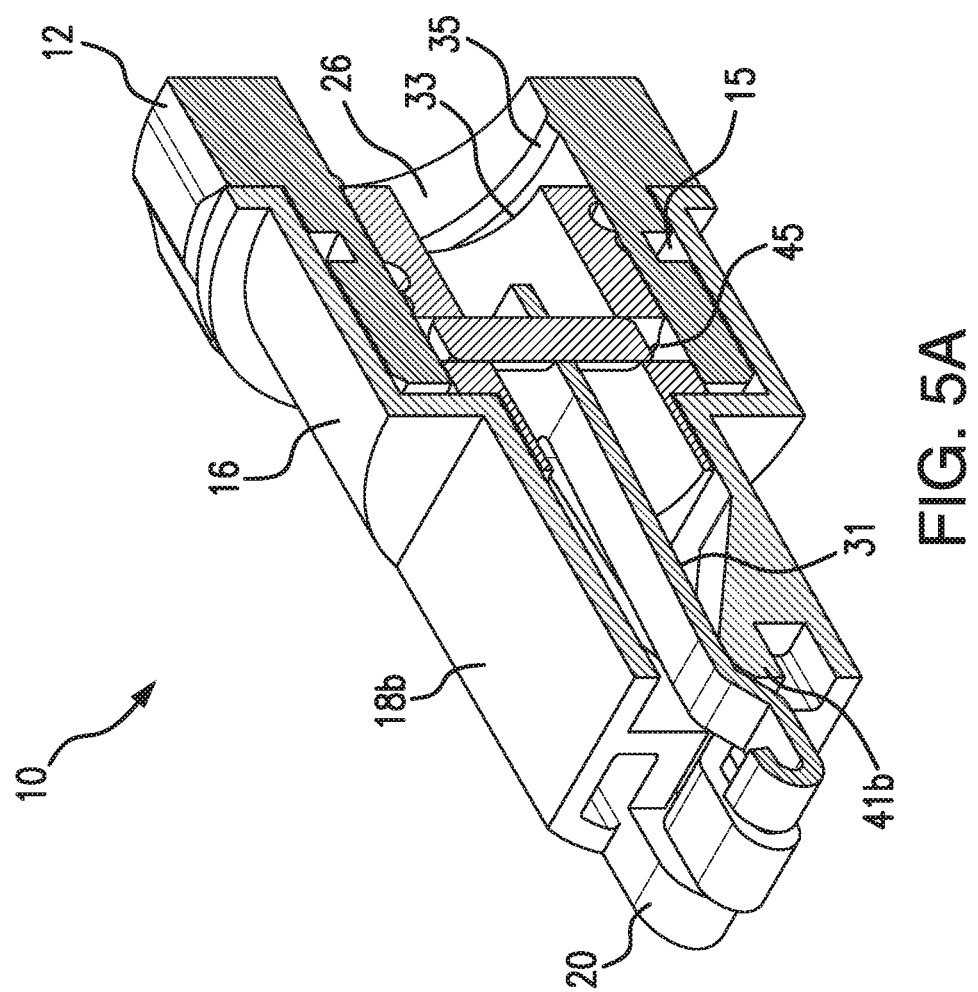

HAND CRANK CAM LOCK

BACKGROUND OF THE INVENTION

Most cam locks are configured to lock and unlock by use of a tool, such as a screwdriver or key. However, if the cam lock is disposed in a hard to reach area that can only be accessed via the side of the cam lock instead of using an axially displaced tool, such as a screwdriver, then the cam lock becomes useless or stuck in a singular position or state unable of being locked or unlocked.

In the visual display industry, display panels and boards need to be quickly erected for presentations or conventions and disassembled to move on to the next location, such as Las Vegas or Chicago. The above disadvantages of needing an axially displaced tool to operate most cam locks can slow down the process of assembling and disassembling these displays.

Thus, there is a need in the art to provide a cam lock that does not have the failings discussed above for locking or unlocking.

BRIEF SUMMARY OF THE INVENTION

The invention provides a cam lock which includes an outer body, a plurality of movable hooks disposed in the outer body for translational motion, a rotatable dial disposed in the outer body for rotational motion, and a cam mechanism configured to couple the rotatable dial and the plurality of movable hooks. The rotatable dial is configured to rotate causing translational movement of the plurality of movable hooks within the outer body to operate between a locked state and an unlocked state.

The invention also provides a cam lock system which includes an outer body, a plurality of movable hooks disposed in the outer body for translational motion, a rotatable dial disposed in the outer body for rotational motion, a cam mechanism configured to couple the rotatable dial and the plurality of movable hook and a lockable frame structure configured to insert the outer body. The rotatable dial is configured to rotate causing translational movement of the plurality of movable hooks within the outer body to operate between a locked state and an unlocked state.

BRIEF DESCRIPTION OF THE SEVERAL VIEWS OF THE DRAWING(S)

FIG. 5A is a perspective phantom cross sectional view of the rotational and translational elements of FIG. 1.

DETAILED DESCRIPTION OF THE INVENTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
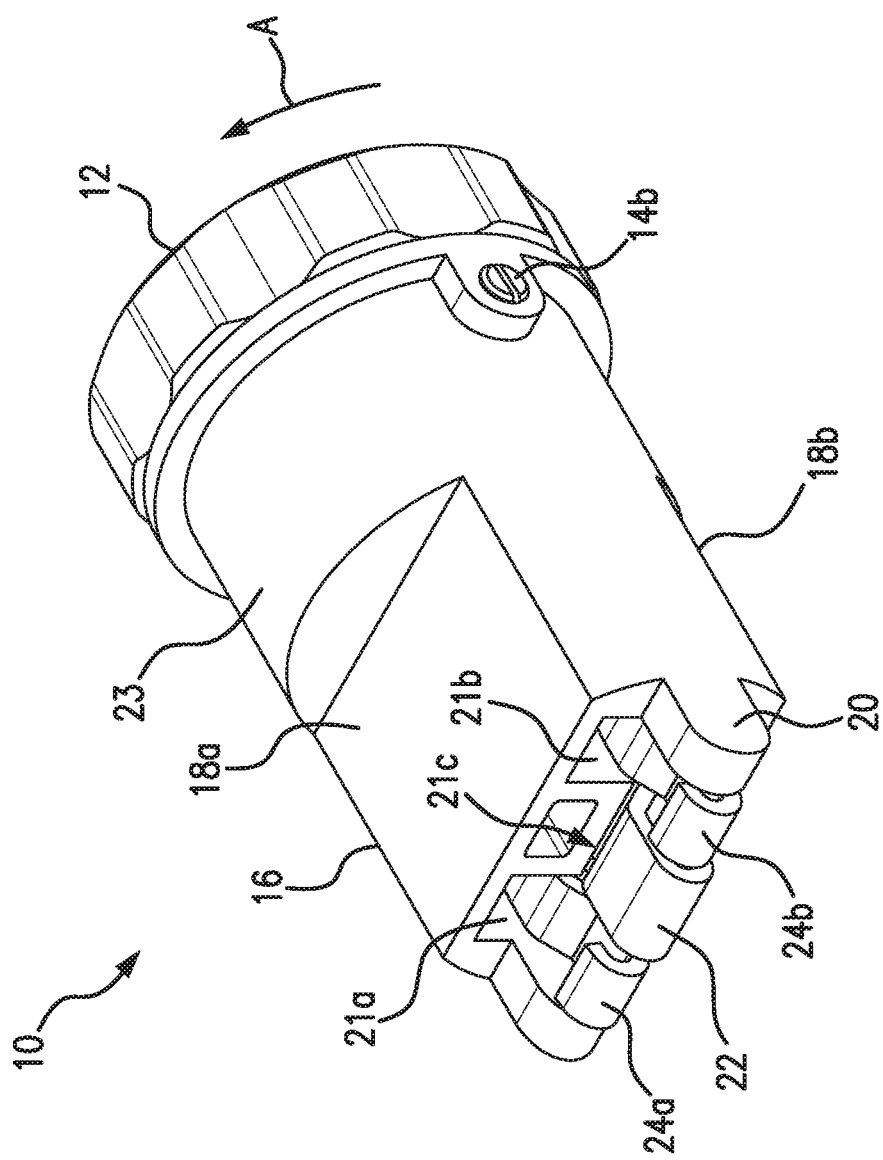
FIG. 1 is a perspective view of a hand crank cam lock according to an embodiment.

Referring now to FIG. 1 there is a perspective view of a hand crank cam lock 10 according to an embodiment. In certain embodiments, cam lock 10 comprises an outer body 16 configured at a first end at 12 to include a rotatable hand crank dial 12 coupled to a plurality of locking hooks 24a, 24b, 22 disposed at a second end at 20 opposite the first end at 12. The hooks 22, 24a, 24b slide back along channels 21a, 21b, 21c inside the outer body 16 to freely engage and disengage from a locked position to an unlocked position as shown in FIGS. 4B and 5B, respectively.

The plurality of locking hooks 24a, 24b, 22 includes hooks 24a, 24b directed towards a first side 18a of outer body 16 and includes hook 22 directed to a second side 18b of outer body 16. The plurality of hooks 24a, 24b, 22 are configured to move translationally away and toward second end at 20 in an x-direction dependent on the rotation of the hand crank dial 12. For example, the plurality of hooks 24a, 24b, 22 move towards second end at 20 when hand crank dial 12 is rotated as shown by arrow A and the plurality of hooks 24a, 24b, 22 move away from second end at 20 when hand crank dial 12 is rotated in the opposite direction of arrow A. In some embodiments, outer body 16 includes a cylindrical portion 23 disposed proximal first end at 12 and reduction portions 18a, 18b disposed proximal second end at 20.

Figure 2:
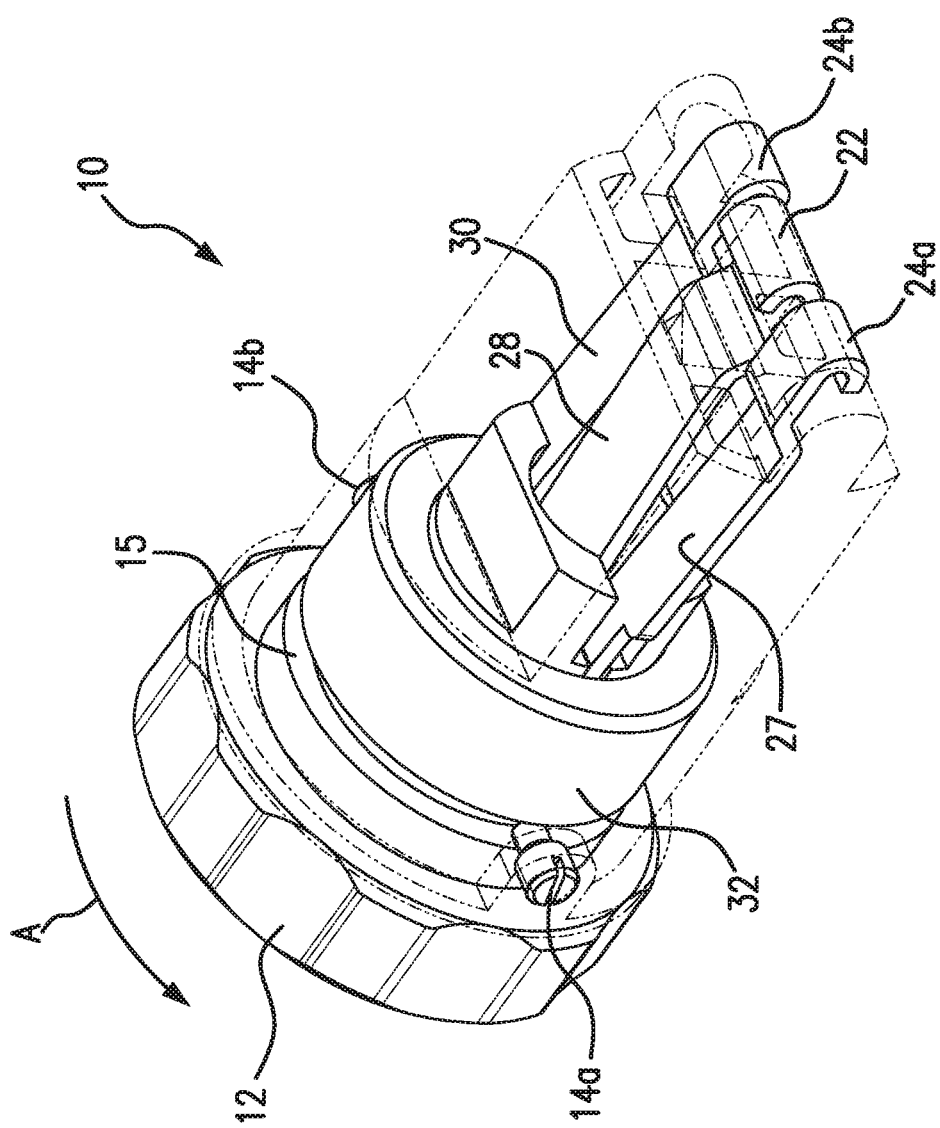
FIG. 2 is a perspective internal phantom view of the hand crank cam lock of FIG. 1.
Figure 3A:
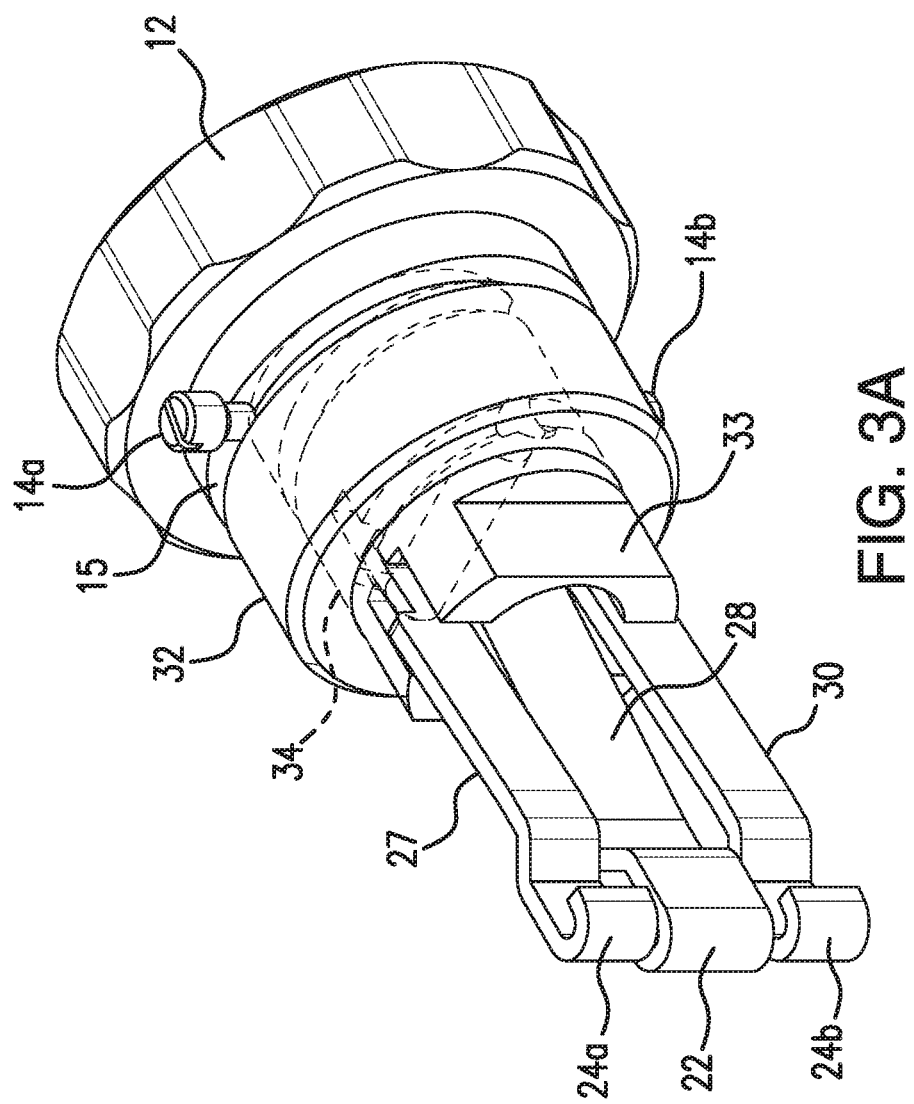
FIG. 3A is a perspective internal phantom view of the rotational and translational elements of the hand crank cam lock of FIG. 1.
Figure 3B:
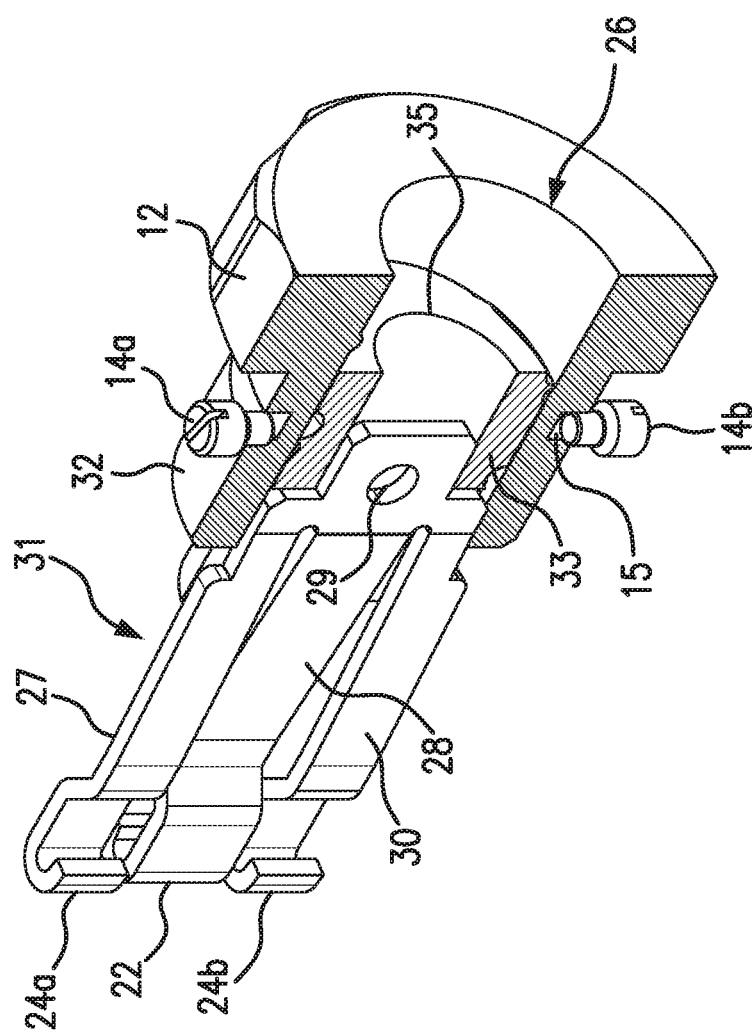
FIG. 3B is a perspective cross-sectional view of the hand crank cam lock of FIG. 3A.

Referring now to FIG. 2, there is a perspective internal phantom view of the hand crank cam lock 10 of FIG. 1. In certain embodiments, cam lock 10 includes a first hook arm 27 connected to hook 24a, a second hook arm 28 connected to hook 22 and a third hook arm 30 connected to hook 24b. Hook arms 27, 28 and 30 may be integral with hooks 24a, 24b and 22. In some embodiments the hook arms 27, 28 and 30 and the hooks 24a, 24b and 22 comprise a unitary flat spring 31 as shown in FIG. 3B. In certain embodiments, hand crank 12 also includes an internal rotational cylindrical portion 32 having a circumferential channel 15, as shown in FIGS. 3A and 3B, configured to accept connector screws or pegs 14a, 14b to allow for rotational motion but to prevent any axial movement to hold hand crank dial 12 into position within outer body 16 by restricting the motion of the hand crank 12 from pushing out of the outer body 16. The hand crank dial 12 will remain stationary by two pins or screws 14a, 14b that will screw into the outer body 16 and can be seen in FIGS. 3A and 3B.

Referring now to FIGS. 3A and 3B, there is a perspective internal phantom view and cross-sectional view of the rotational and translational elements of the hand crank cam lock 10 of FIG. 1. In certain embodiments, hank crank dial 12 is integral with cylindrical portion 32 including a translational holder 32. Translational holder 32 is configured to move axially within cylindrical portion 32 via a screw configuration along threads 35 as shown in FIG. 3B. Holder 32 includes a holder slot 34 disposed along a diameter of holder 33 and configured to hold a distal end of flat spring 31. Flat spring 31 includes a lock pin orifice 29 disposed at the distal end opposite the plurality of hooks 22, 24a, 24b disposed at its proximal end. In some embodiments, hooks 24a and 24b open opposite hook 22 direction. Threads 35 are configured to axially move translational holder 33 in and out of cylindrical portion 32 upon rotation of hand crank dial 12 during operation. In some embodiments, a ¼ turn of hand crank dial 12 is required to lock or unlock the cam lock 10. In some embodiments, hand crank 12 may include grips to provide a frictional surface when operating the hand crank dial 12.

Figure 4A:
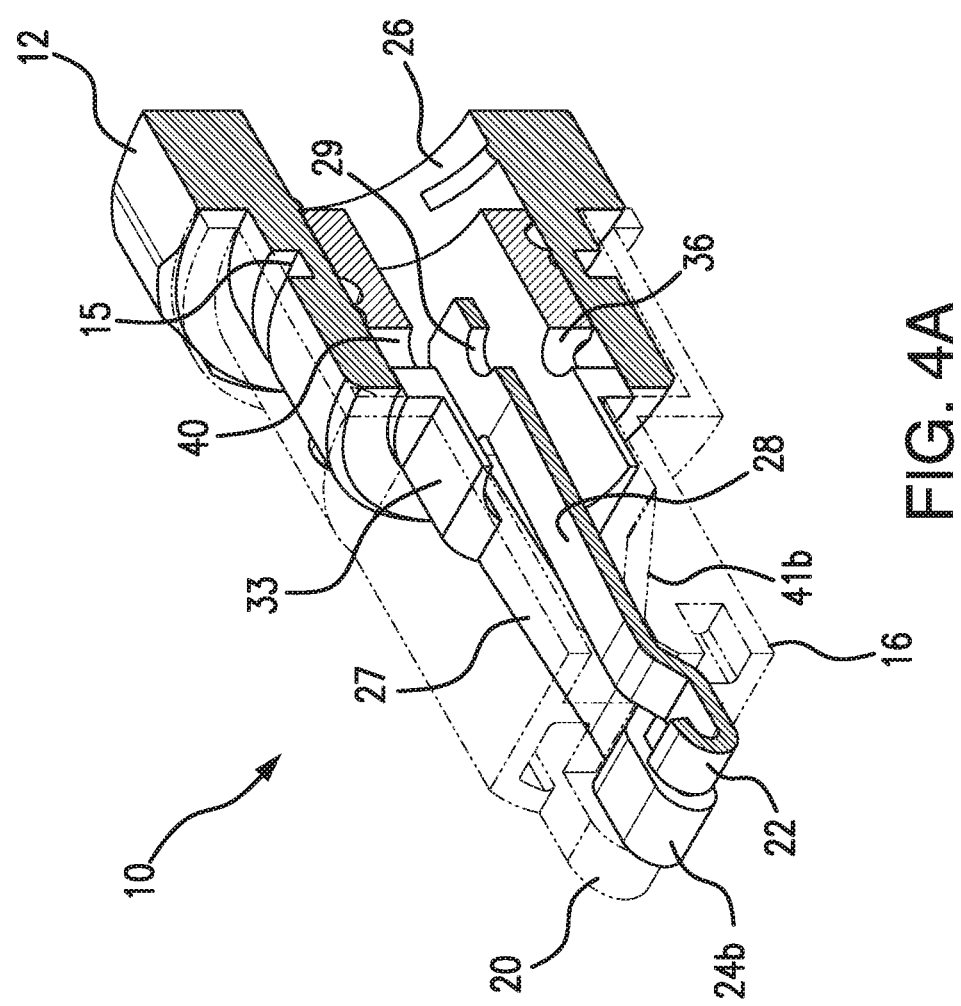
FIG. 4A is a perspective cross-sectional phantom view of the hand crank cam lock of FIG. 2.
Figure 4B:
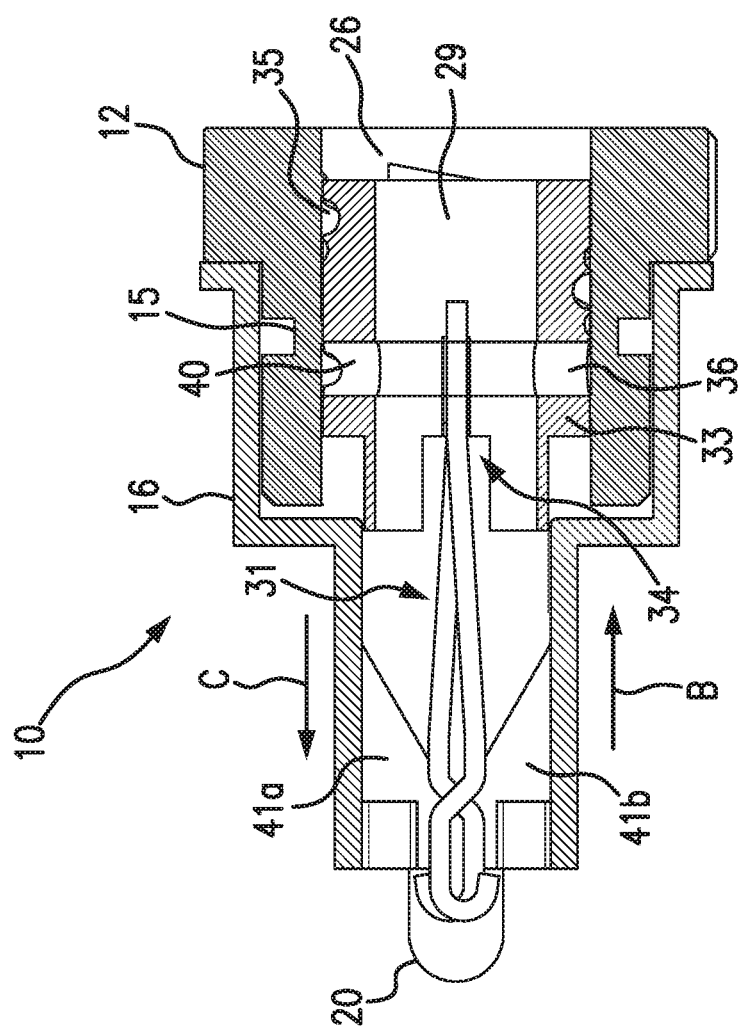
FIG. 4B is a cross-sectional view of the hand crank cam lock of FIG. 2.
Figure 5B:
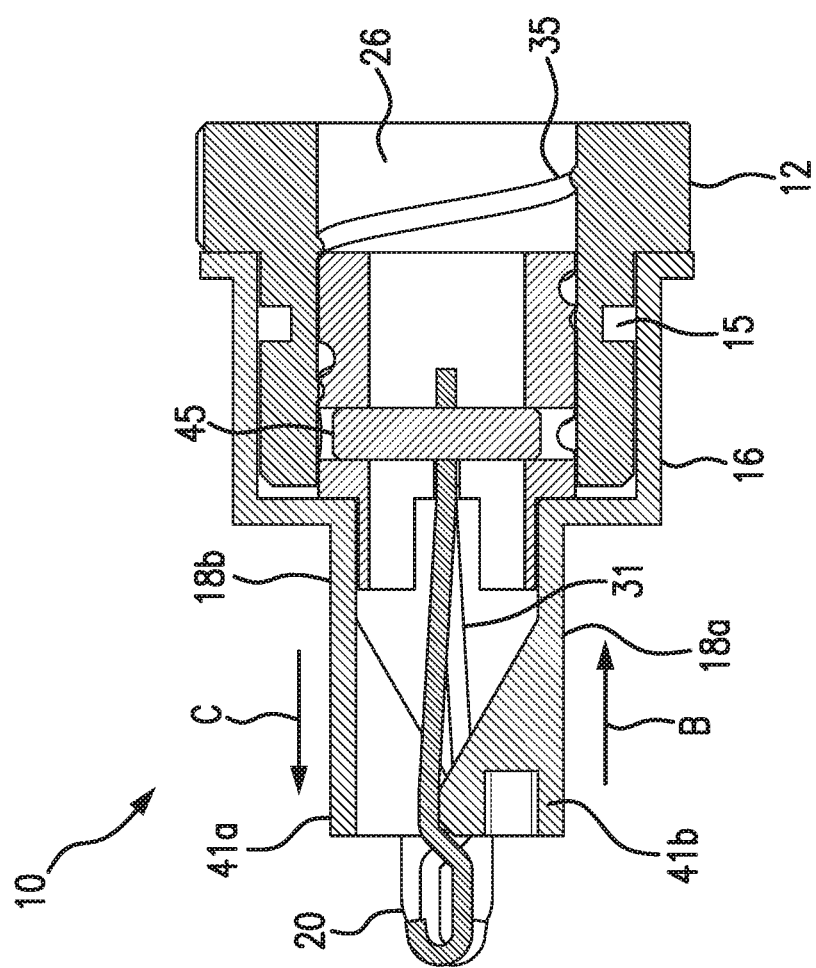
FIG. 5B is a cross-sectional view of the rotational and translational elements of FIG. 5A.

Referring now to FIGS. 4A and 4B, there is a perspective cross-sectional phantom view of the hand crank cam lock 10 of FIG. 2. In certain embodiments, cam lock 10 includes a central orifice 26 configured to threadingly hold and move the translational holder 33 for axial motion upon the rotation of hand crank dial 12. Holder 33 includes a first engagement hole 36 and a second engagement hole 40 diametrically opposed and in alignment with lock pin orifice 29 disposed at the distal end of flat spring 31. In some embodiments, flat spring 31 is disposed at its distal end within the slot 34 of holder 33. At the proximal or hook end of the flat spring 31 are a plurality of ramps 41a, 41b configured to urge or bias hook arms 27, 28 and 30 away from reduced portions 18a, 18b when in an open or unlocked position, arrow C as shown in FIG. 5B and to urge or bias hook arms 27, 28 and 30 towards reduced portions 18a, 18b when in a closed or locked position, arrow B as shown in FIG. 4B.

Referring now to FIGS. 5A and 5B, there is a perspective phantom cross sectional view of the rotational and translational elements of the hand crank cam lock 10 of FIG. 1. As discussed above, in certain embodiments, cam lock 10 includes a central orifice 26 configured to threadingly hold and move the translational holder 33 for axial motion upon the rotation of hand crank 12. Holder 33 includes a first engagement hole 36 and a second engagement hole 40 diametrically opposed and in alignment with lock pin orifice 29 disposed at the distal end of flat spring 31. In some embodiments, flat spring 31 is held in place via a lock pin 45 disposed within the holes 36, 40 and orifice 29 to provide axial movement for translational motion of the flat spring 31 and its integral hooks 24a, 24b, 22 along ramps 41a, 41b. In certain embodiments, ramps 41a, 41b are configured to cause the hook arms 27, 28 and 30 to offset with respect to each other. In other words, arms 27 and 30 may abut ramps to move in the same direction orthogonal to an axial direction while arm 28, the central arm, may abut a ramp to move in an opposing direction orthogonal to the axial direction when a user is locking or unlocking cam lock 10 as shown in FIGS. 4B and 5B.

Figure 6A:
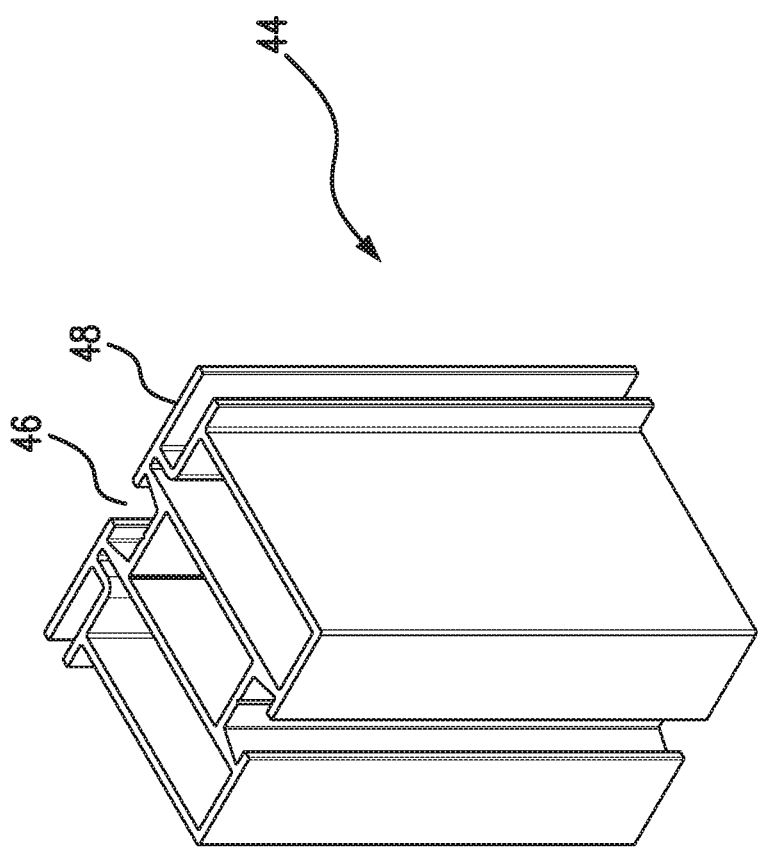
FIG. 6A is a perspective view of a C-channel structure in which the cam lock is configured to engage according to an embodiment.
Figure 6B:
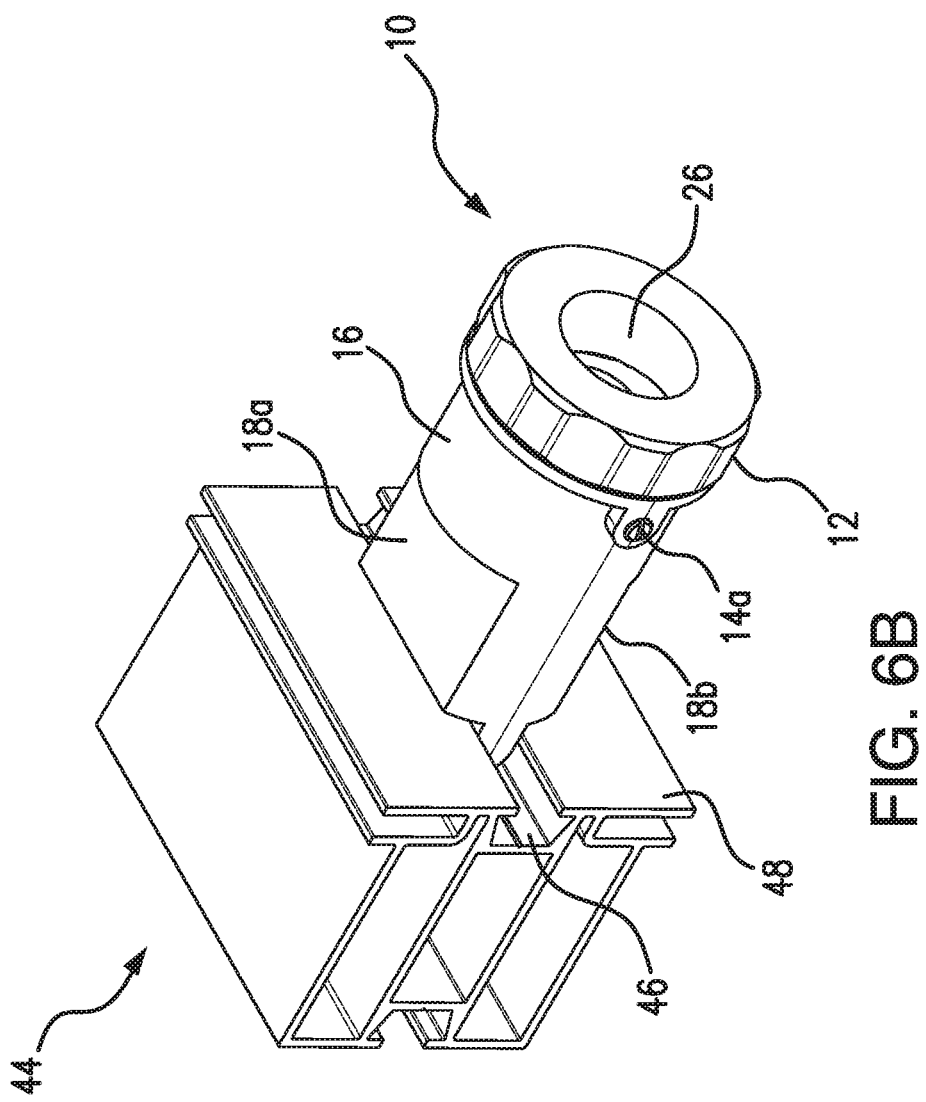
FIG. 6B is a perspective view of the cam lock engaged within the C-channel structure of FIG. 6A.
Figure 6C:
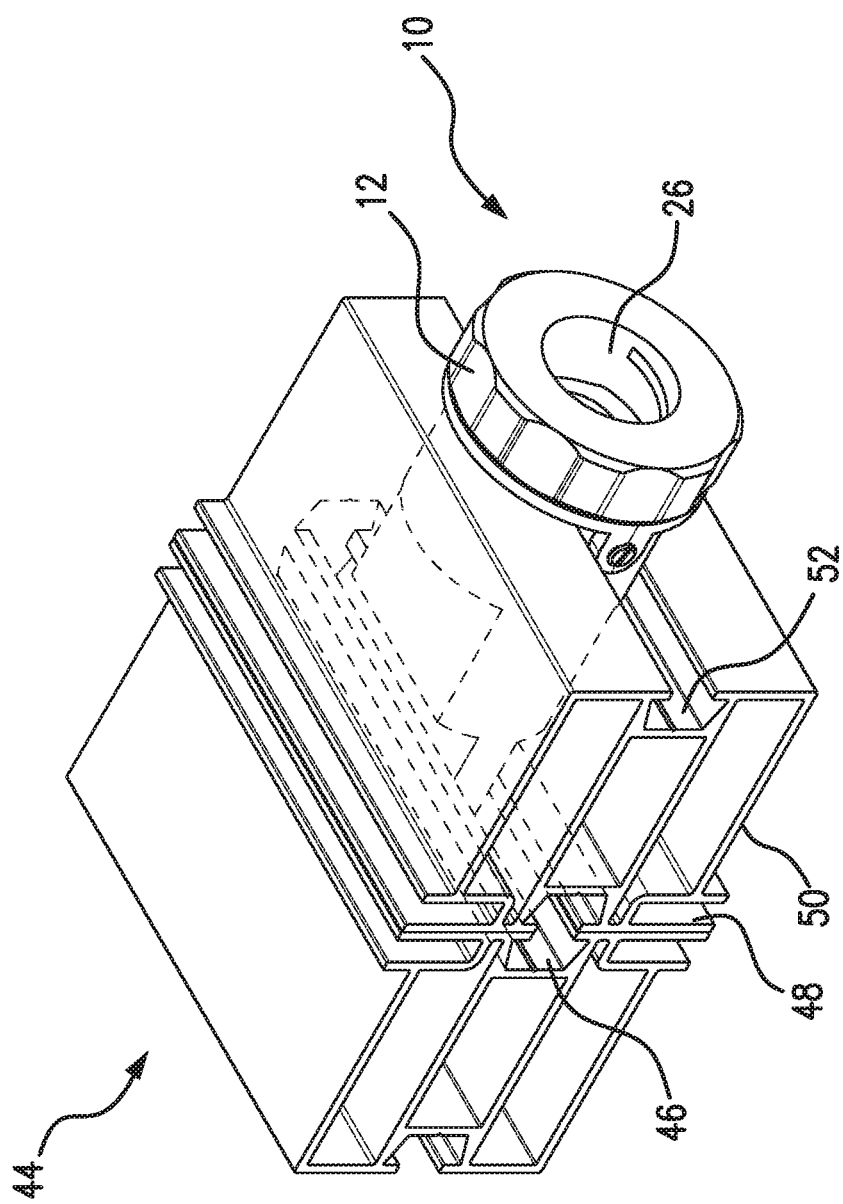
FIG. 6C is a perspective view of the cam lock clamping C-channel structures together during operation of the cam lock according to an embodiment.
Figure 7:
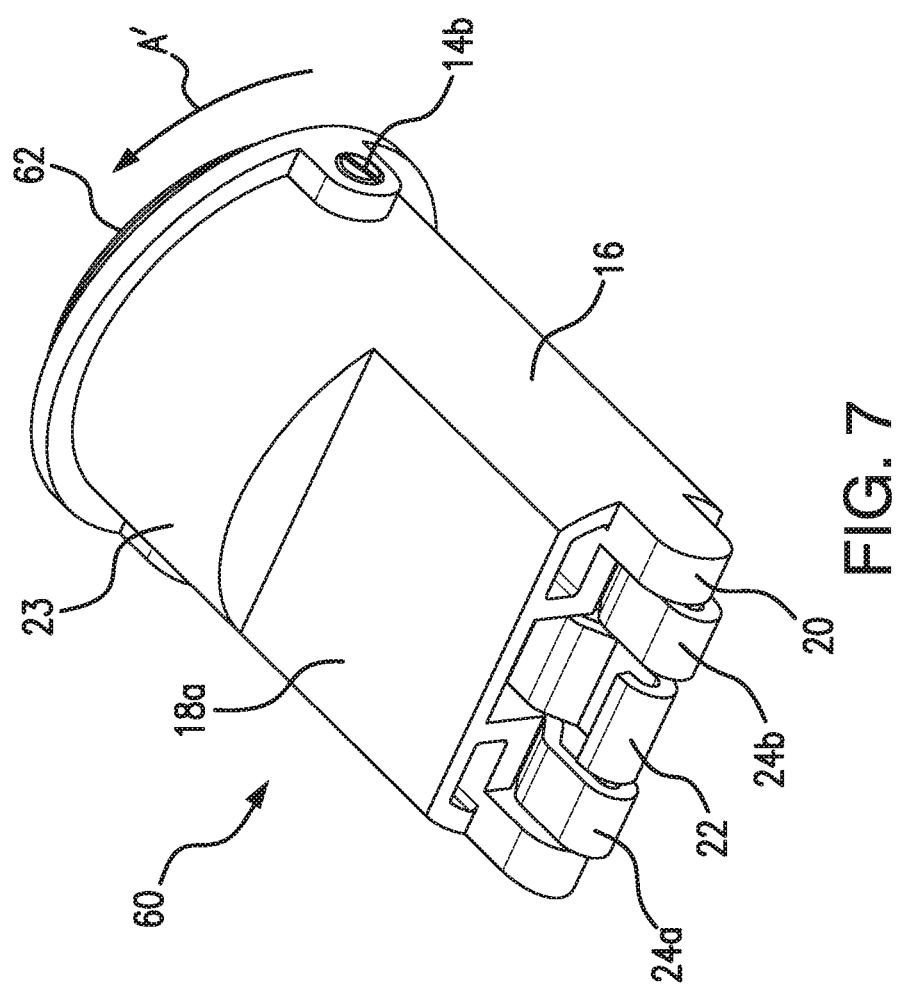
FIG. 7 is a perspective view of a keyed crank cam lock according to another embodiment.
Figure 8:
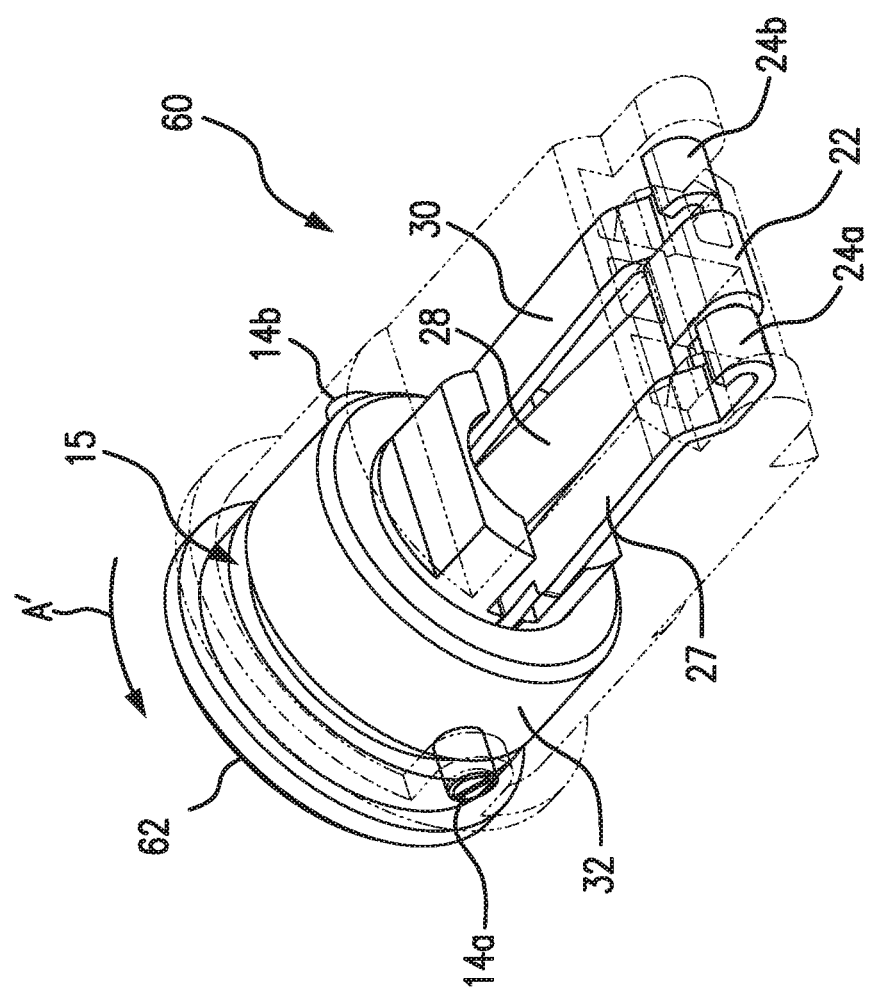
FIG. 8 is a perspective internal phantom view of the hand crank cam lock of FIG. 7.
Figure 9A:
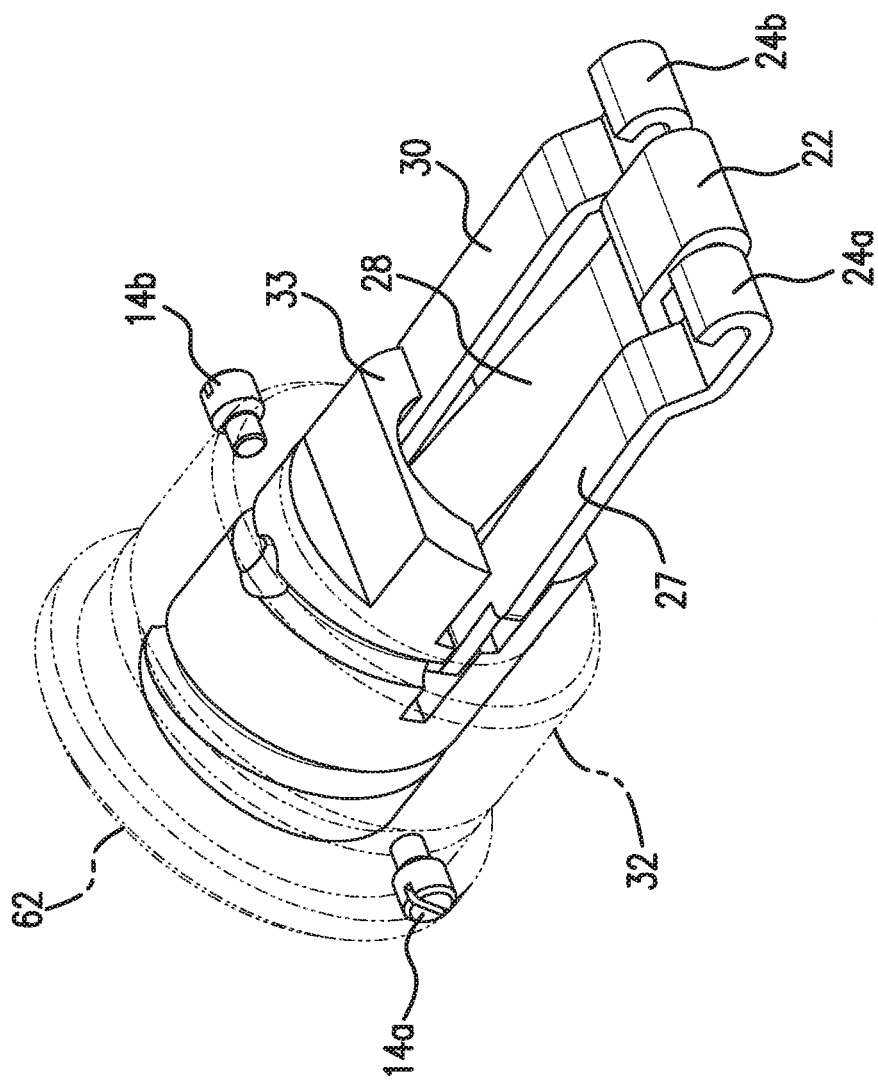
FIG. 9A is a perspective internal phantom view of the rotational and translational elements of the hand crank cam lock of FIG. 7.
Figure 9B:
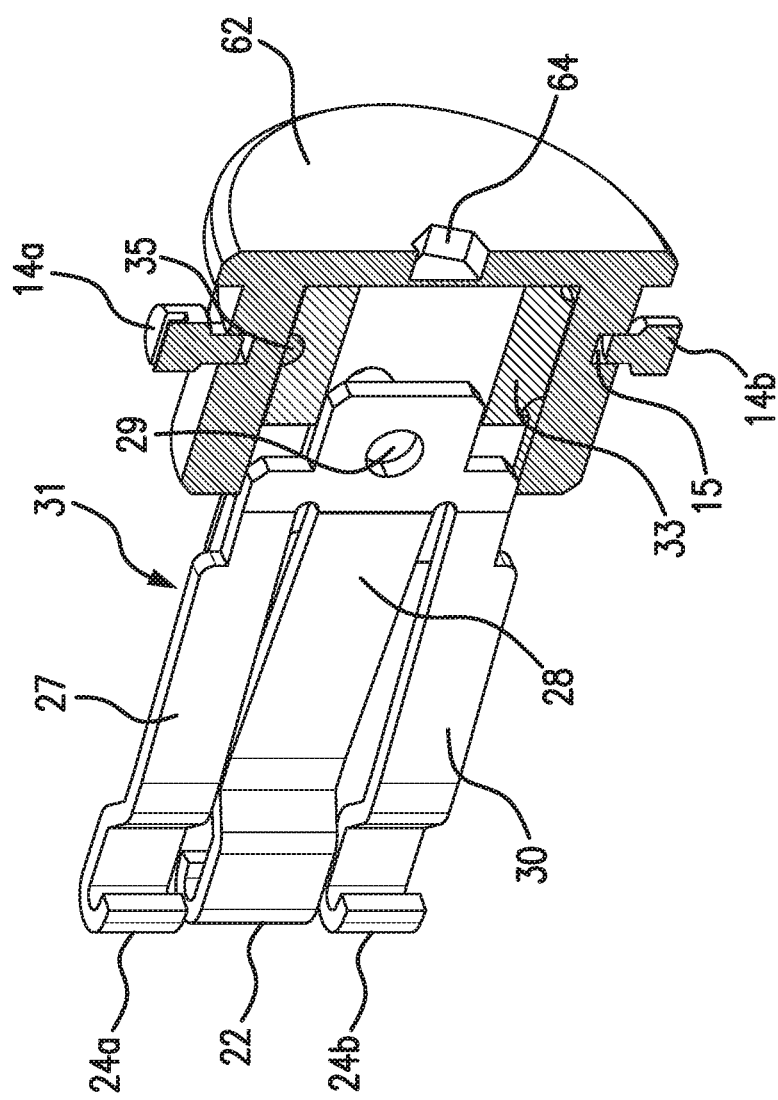
FIG. 9B is a perspective cross-sectional view of the hand crank cam lock of FIG. 9A.
Figure 10A:
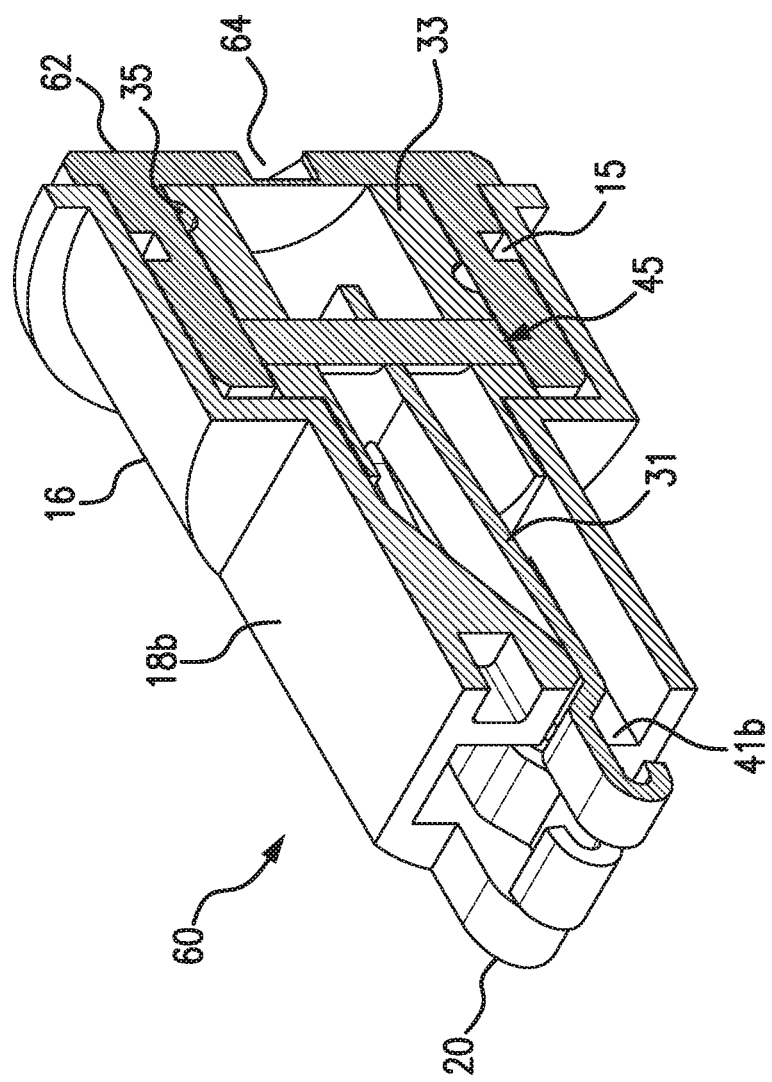
FIG. 10A is a perspective phantom cross sectional view of the rotational and translational elements of FIG. 7.
Figure 10B:
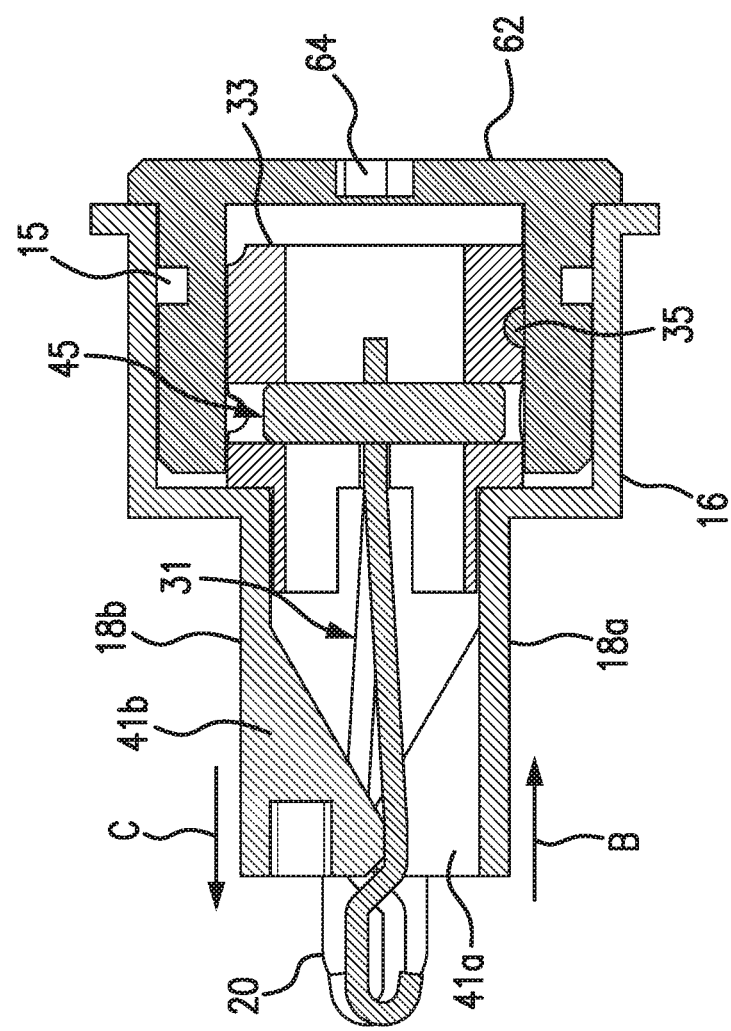
FIG. 10B is a cross-sectional view of the rotational and translational elements of FIG. 10A.
Figure 11A:
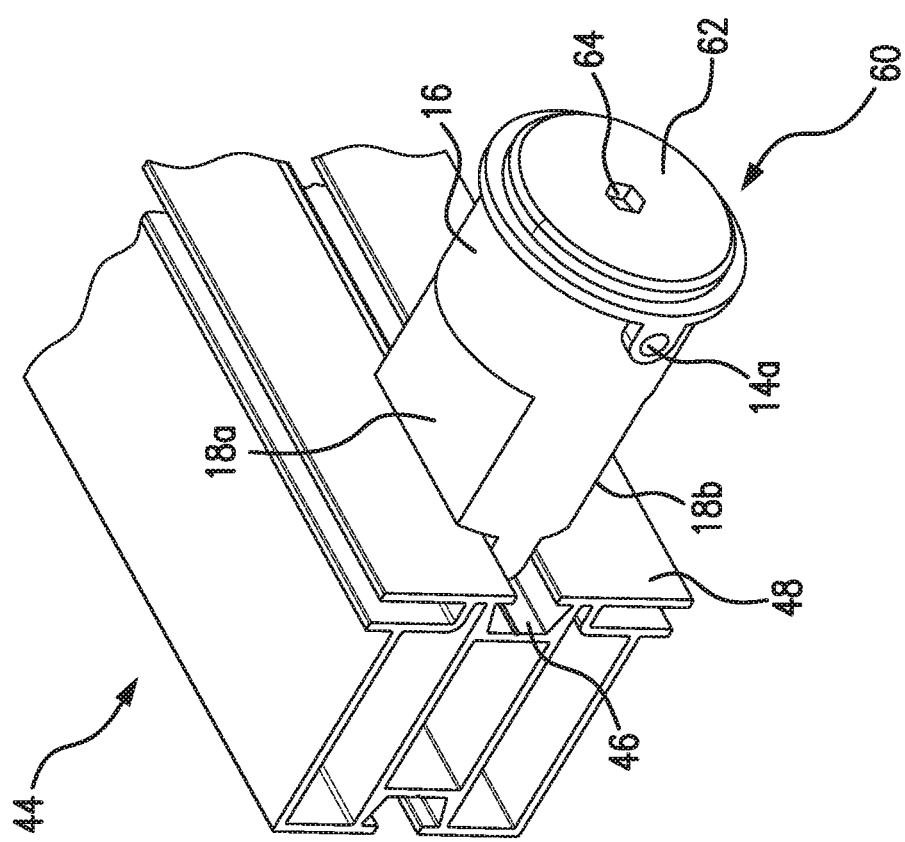
FIG. 11A is a perspective view of the cam lock engaged within a C-channel structure according to another embodiment.
Figure 11B:
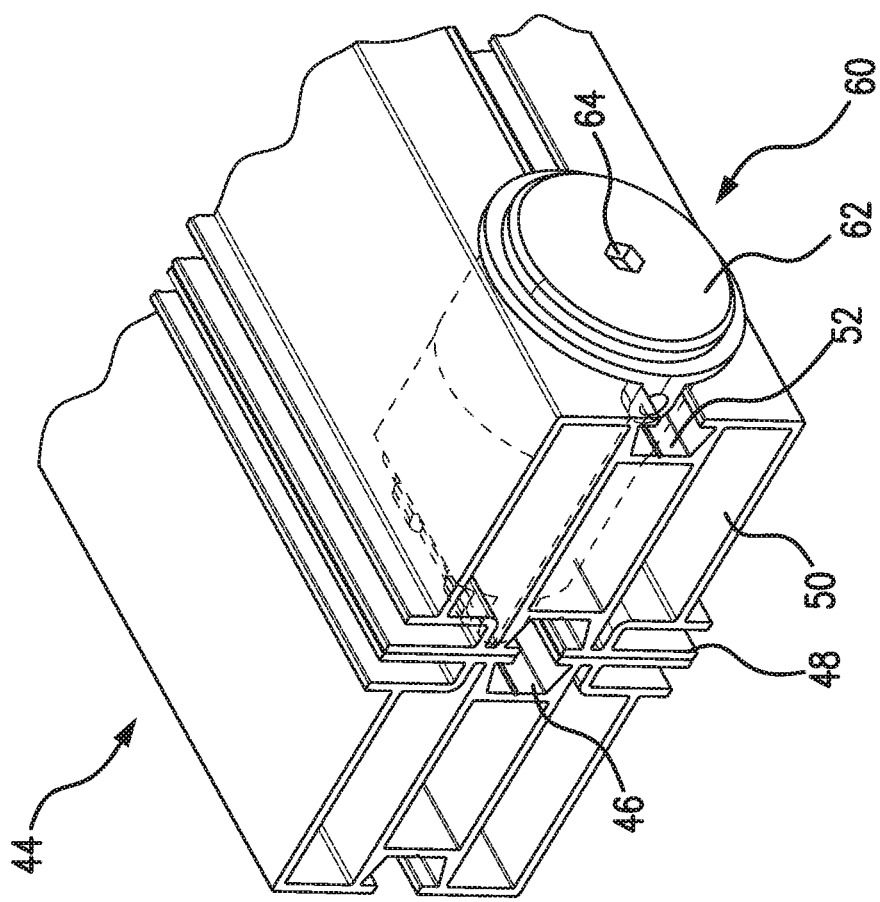
FIG. 11B is a perspective view of the cam lock clamping C-channel structures together during operation of the cam lock according to an embodiment.

Referring now to FIGS. 6A to 6C, there is a perspective view of a C-shaped channel frame 44 in which the cam lock 10 is configured to engage according to an embodiment. In certain embodiments, frame 44 includes a C-shaped channel 46 and an abutment surface 48. FIG. 6B is a perspective view of the cam lock 10 engaged within the C-shaped channel 46 of frame 44. In some embodiments, the second end at 20 of cam lock 10 is configured to slidingly fit within C-shaped channel 46 while a secondary frame 50 also including a C-shaped channel 52 and an opening configured to allow cam lock 10 to pass through as shown. In some embodiments, cam lock 10 may be configured with first protrusions at 20 shaped to fit within channel 46 and second protrusions at 14 shaped to fit within channel 52 to secure cam lock 10 from rotational movement of outer body 16 during operation or rotation of hand crank 12 when locking or unlocking the cam lock 10. The secondary frame 50 and C-shaped channel frame 44 may be configured to contact at surface 48 when cam lock 10 is in the locked position, as shown by arrow B in FIG. 4B, upon rotation of hand crank dial 12 in a clock-wise direction causing the plurality of hooks 22, 24a, 24b to engage c-channel 46 to clamp the frames 44, 50 together. In some embodiments, frames 44 and 50 may be display walls, table tops, table legs, display protrusions or the like, where cam lock 10 may include a plurality of cam locks requiring no tools to lock or unlock, only the hand crank dial 12 to operate. Further, it should be appreciated that the C-shape may be any other shape for which the hooks 22, 24a, 24b may properly and securely engage during operation of the cam lock 10.

In certain embodiments, the hooks 22, 24a, 24b will lock into the frame 44 at C-shaped channel 46 by the use of friction. The force needed to turn the hand crank dial 12 will need to be greater than or equal to the force needed to overcome the friction between the hooks 22, 24a, 24b and the ramps 41a, 41b inside the outer body 16 which will occur at a point of contact between the ramps 41a, 41b and the hooks 22, 24a, 24b as shown in FIG. 5A.

In operation, the hand crank cam lock 10 joins two separate extrusions or frames (44, 50) together in a toolless manner. The hand crank cam lock 10 locks these frames (44, 50) when the hand crank dial 12 is turned clockwise, the hooks 22, 24a, 24b slide back along channels 21a, 21b, 21c inside the outer body 16 to grab the inner walls or C-shaped channel 46 of frame 44. This will in turn lock hooks 22, 24a, and 24b into place against C-shaped channel 46. The hand crank dial 12 will only require half a turn to travel the required distance to lock the hooks 22, 24a, 24b into place as shown in FIG. 4B. In some embodiments, the rotation of hand crank dial 12 to engage or disengage C-shaped channel 46 may be performed by hand tightening or hand loosening rotation action from the side of hand crank dial 12.

To release the hooks 22, 24a, 24b from the C-shaped channel 46, the hand crank dial 12 will require a half turn in the counter clockwise direction. On the inside of the hand crank cam lock 10, the hooks 22, 24a, 24b are connected to a threaded piece 31 by a lock pin 45 that will move the hooks 22, 24a, 24b back and forth, shown by arrows B and C, without torqueing them past their breaking point. This is achieved by slot 34 in the holder 33 that guides the hooks 22, 24a, 24b and restricts the torqueing force.

FIGS. 7 to 11B illustrate an alternative embodiment of the cam lock 10, now denoted as tooled cam lock 60 in these figures. It should be appreciated that reference numerals of the structural elements and functionality are the same as described above for cam lock 10 as shown accordingly. However, tooled cam lock 60 includes a rotatable tool crank dial 62 instead of the hand crank dial 12 discussed above. In some embodiments, tool crank dial 62 functions similarly to the hand crank dial 12, however, tool crank dial 62 includes at its center axis a tool receiver 64 embedded therein and configured to accommodate a tool, such as, an allen key (not shown) to be inserted into the tool receiver 64 to cause, upon rotation action of the tool, the tool crank dial 62 to rotate as indicated by arrow A' in FIGS. 7 and 8 to lock the tooled cam lock 60 via hooks 22, 24a, 24b in a similar manner as described above with respect to cam lock 10. In some embodiments, the rotation of tool crank dial 62 to engage or disengage C-shaped channel 46 may be performed by tool tightening or tool loosening rotation action from the side of tool crank dial 62.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A cam lock, comprising:
an outer body;
a plurality of movable hooks disposed in the outer body for translational motion;
a rotatable dial disposed in the outer body for rotational motion; and
a cam mechanism configured to couple the rotatable dial and the plurality of movable hooks,
wherein the rotatable dial is configured to rotate causing translational movement of the plurality of movable hooks within the outer body to operate between a locked state and an unlocked state,
wherein the cam mechanism includes an exterior surface and an interior surface with the exterior surface having a threaded surface configured to engage the interior surface having a threaded surface of the rotatable dial for translational motion; and
wherein the outer body includes at least two protrusions configured to prevent rotation of the outer body when the rotatable dial is rotated.

2. The cam lock of claim 1, wherein the plurality of movable hooks are configured to translate in a juxtaposed position about a central axis.

3. The cam lock of claim 1, wherein the plurality of movable hooks is a unitary mechanism.

4. The cam lock of claim 3, wherein the unitary mechanism is coupled to the cam mechanism for translational motion.

5. The cam lock of claim 1, wherein the plurality of movable hooks protrude through the outer body in a horizontal plane and are offset with respect to each other in the horizontal plane.

6. The cam lock of claim 4, wherein the coupling comprises a connector rod inserted within the unitary mechanism and the cam mechanism.

7. The cam lock of claim 3, wherein the unitary mechanism is a flat spring.

8. The cam lock of claim 1, wherein the rotatable dial is a rotatable hand crank dial configured to lock the plurality of hooks with a quarter clockwise hand turn by a user and to unlock the plurality of hooks with a quarter counter-clockwise hand turn by the user.

9. The cam lock of claim 1, wherein the rotatable dial is a tool crank dial configured to receive a tool to cause the tool crank dial to rotate where the rotation is configured to cause the plurality of hooks to lock with a quarter clockwise tooled turn by a user and to cause the plurality of hooks to unlock with a quarter counter-clockwise tooled turn by the user.

10. A cam lock system, comprising:
an outer body;
a plurality of movable hooks disposed in the outer body for translational motion;
a rotatable dial disposed in the outer body for rotational motion;
a cam mechanism configured to couple the rotatable dial and the plurality of movable hooks; and
a lockable frame structure configured to insert the outer body, wherein the rotatable dial is configured to rotate causing translational movement of the plurality of movable hooks within the outer body to operate between a locked state and an unlocked state, wherein the cam mechanism includes an exterior surface and an interior surface with the exterior surface having a threaded surface configured to engage the interior surface having a threaded surface of the rotatable dial for translational motion; and wherein the rotatable dial is a rotatable hand crank dial configured to lock against the lockable frame structure via the plurality of hooks with a quarter clockwise hand turn by a user and to unlock the plurality of hooks with a quarter counter-clockwise hand turn by the user.

11. The cam lock system of claim 10, wherein the plurality of movable hooks are configured to translate in a juxtaposed position about a central axis.

12. The cam lock system of claim 10, wherein the plurality of movable hooks are a unitary mechanism.

13. The cam lock system of claim 12, wherein the unitary mechanism is coupled to the cam mechanism for translational motion into and out of the lockable frame structure.

14. The cam lock system of claim 10, wherein the plurality of movable hooks protrude through the outer body in a horizontal plane and are offset with respect to each other in the horizontal plane.

15. The cam lock system of claim 13, wherein the coupling comprises a connector rod inserted within the unitary mechanism and the cam mechanism.

16. The cam lock system of claim 12, wherein the unitary mechanism is a flat spring.

17. The cam lock system of claim 10, wherein the outer body includes at least two protrusions configured to prevent rotation of the outer body when the cam lock is inserted and rotated while disposed within the lockable frame structure.

18. The cam lock of claim 10, wherein the rotatable dial is a tool crank dial configured to receive a tool to cause the tool crank dial to rotate where the rotation is configured to cause the plurality of hooks to lock with a quarter clockwise tooled turn by a user and to cause the plurality of hooks to unlock with a quarter counter-clockwise tooled turn by the user.

19. A cam lock, comprising:
an outer body;
a plurality of movable hooks disposed in the outer body for translational motion;
a rotatable dial disposed in the outer body for rotational motion; and
a cam mechanism configured to couple the rotatable dial and the plurality of movable hooks,
wherein the rotatable dial is configured to rotate causing translational movement of the plurality of movable hooks within the outer body to operate between a locked state and an unlocked state,
wherein the cam mechanism includes an exterior surface and an interior surface with the exterior surface having a threaded surface configured to engage the interior surface having a threaded surface of the rotatable dial for translational motion; and
wherein the rotatable dial is a tool crank dial configured to receive a tool to cause the tool crank dial to rotate where the rotation is configured to cause the plurality of hooks to lock with a quarter clockwise tooled turn by a user and to cause the plurality of hooks to unlock with a quarter counter-clockwise tooled turn by the user.

* * * * *